US 9,046,975 B2

(12) United States Patent
Kang et al.

(10) Patent No.: US 9,046,975 B2
(45) Date of Patent: Jun. 2, 2015

(54) FLEXIBLE TOUCH SCREEN PANEL AND FLEXIBLE DISPLAY DEVICE HAVING THE SAME

(75) Inventors: Sung-Ku Kang, Yongin (KR);
Tae-Hyeog Jung, Yongin (KR);
Hak-Sun Kim, Yongin (KR); Jung-Yun Kim, Yongin (KR); Byeong-Kyu Jeon, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 170 days.

(21) Appl. No.: 13/611,806

(22) Filed: Sep. 12, 2012

(65) Prior Publication Data

US 2013/0300678 A1 Nov. 14, 2013

(30) Foreign Application Priority Data

May 10, 2012 (KR) .................. 10-2012-0049724

(51) Int. Cl.
*G06F 3/041* (2006.01)
*G06F 3/044* (2006.01)

(52) U.S. Cl.
CPC ...... *G06F 3/044* (2013.01); *G06F 2203/04102* (2013.01)

(58) Field of Classification Search
CPC ............... G06F 2203/04102; G06F 3/044
USPC ........................................... 345/173
See application file for complete search history.

(56) References Cited

U.S. PATENT DOCUMENTS

| 7,663,607 | B2 | 2/2010 | Hotelling et al. | |
|---|---|---|---|---|
| 7,920,129 | B2 | 4/2011 | Hotelling et al. | |
| 2002/0190961 | A1* | 12/2002 | Chen | 345/173 |
| 2008/0062148 | A1 | 3/2008 | Hotelling et al. | |
| 2011/0001706 | A1* | 1/2011 | Sanford et al. | 345/173 |
| 2011/0012845 | A1* | 1/2011 | Rothkopf et al. | 345/173 |
| 2011/0099805 | A1* | 5/2011 | Lee | 29/846 |
| 2011/0261003 | A1* | 10/2011 | Lee et al. | 345/174 |
| 2011/0262631 | A1* | 10/2011 | Lee et al. | 427/123 |
| 2012/0098781 | A1* | 4/2012 | Kim et al. | 345/174 |

FOREIGN PATENT DOCUMENTS

| KR | 10-2009-0087303 A | 8/2009 |
|---|---|---|
| KR | 10-2010-0041733 A | 4/2010 |
| KR | 10-2010-0052227 A | 5/2010 |
| KR | 10-2011-0060338 A | 6/2011 |

* cited by examiner

Primary Examiner — Viet Pham
(74) Attorney, Agent, or Firm — Lee & Morse, P.C.

(57) ABSTRACT

A flexible touch screen panel includes a flexible thin-film substrate including an active region and an inactive region, the inactive region being at an outer side portion of the active region, and the thin-film substrate being configured to bend along at least one bending axis, sensing patterns in the active region of the thin-film substrate, the active region being divided into a plurality of electrically independent regions by the at least one bending axis, and sensing lines in the inactive region of the thin-film substrate, the sensing lines being connected to the sensing patterns.

19 Claims, 6 Drawing Sheets

FLEXIBLE TOUCH SCREEN PANEL AND FLEXIBLE DISPLAY DEVICE HAVING THE SAME

CROSS-REFERENCE TO RELATED APPLICATION

This application claims priority under 35 USC §119 to and the benefit of Korean Patent Application No. 10-2012-0049724, filed on May 10, 2012, in the Korean Intellectual Property Office, the entire content of which is incorporated herein by reference.

BACKGROUND

1. Field

Example embodiments relate to a touch screen panel, and more particularly, to a flexible touch screen panel and a flexible display device having the same.

2. Description of the Related Art

A touch screen panel is an input device capable of inputting a user's instruction by selecting instruction contents displayed on a screen of an image display device, or the like, with a human's hand or an object. The touch screen panel is provided on a front surface of the image display device to convert a contact position directly contacted by the human hand or the object into an electric signal. Therefore, the instruction contents selected at the contact position is recognized as an input signal. Since the touch screen panel may be substituted for a separate input device, e.g., a keyboard or a mouse, application fields thereof have been gradually extended.

For example, the touch screen panel may be implemented as a resistive type touch screen panel, a photosensitive type touch screen panel, a capacitive type touch screen panel, and the like. For example, the capacitive type touch screen panel senses a change in capacitance between a conductive sensing pattern and neighboring sensing patterns (or a ground electrode), when a human hand or an object contacts the touch screen panel, thereby converting a contact position into an electric signal.

The touch screen panel may be attached to an outer surface of the image display device, e.g., a liquid crystal display device or an organic light emitting diode display device. Therefore, the touch screen panel may require high transparency and low thickness. In addition, a touch screen panel attached to a flexible image display device may require high flexibility.

SUMMARY

Example embodiments are directed to a flexible touch screen panel capable of preventing sensing patterns from being damaged in a flexible environment by dividing an active region with the sensing patterns into a plurality of regions by a bending axis on which the sensing patterns are bent, so the sensing patterns on the bending axis are split between the different regions.

Example embodiments are also directed to a flexible display device having the flexible touch screen panel as described above.

Example embodiments include a flexible touch screen panel, having a flexible thin-film substrate including an active region and an inactive region, the inactive region being at an outer side portion of the active region, and the thin-film substrate being configured to bend along at least one bending axis, sensing patterns in the active region of the thin-film substrate, the active region being divided into a plurality of electrically independent regions by the at least one bending axis, and sensing lines in the inactive region of the thin-film substrate, the sensing lines being connected to the sensing patterns.

Sensing patterns in each of the plurality of regions of the active region may be separately operated from sensing patterns in other regions of the plurality of regions.

The thin-film substrate may include a polyimide material.

The thin-film substrate may have a thickness of about 0.005 nm to about 0.05 mm.

Each sensing pattern may include first sensing cells connected to each other in a first direction parallel to the bending axis, first sensing lines connecting adjacent first sensing cells to each other, second sensing cells connected to each other in a second direction perpendicular to the first direction, and second sensing lines connecting adjacent second sensing cells to each other.

The first connecting lines and the second connecting lines may have an insulating layer interposed therebetween at an intersection portion therebetween.

Sensing patterns in a region overlapping the bending axis may include divided second sensing cells, each divided second sensing cell including two portions spaced apart from each other.

The two portions in each divided second sensing cell may be spaced apart from each other along the second direction, the bending axis being between the two portions.

Each of the two portions in each divided second sensing cell may include a protrusion part, the protrusion part extending along the second direction to partially overlap the bending axis.

Sensing patterns in a first region of the plurality of regions may be connected to a pad part by different sensing lines than sensing patterns in a second region of the plurality of regions, the first and second regions being different from each other.

The different sensing lines of the first and second regions may be connected to a same pad part, the pad part being at a distal end of one side of the inactive region.

Some of the sensing lines may intersect the bending axis, the sensing lines being branched into a plurality of lines at a portion intersecting the bending axis.

Some of the sensing lines may intersect the bending axis, a first portion of the sensing lines at a portion intersecting the bending axis having a wider area than other portions of the sensing lines.

The portion of the sensing lines having the wider area may include a plurality of holes.

Some of the sensing lines may intersect the bending axis, the sensing lines include a connection part of a different material at a portion intersecting the bending axis, and the connection part being connected to the sensing lines through contact holes.

The different sensing lines of the first and second regions may be connected to a plurality of pad parts at different positions of the inactive region, respectively.

Example embodiments include a flexible display device having a touch screen panel, the flexible display device including a flexible thin-film substrate including an active region and an inactive region, the inactive region being at an outer side portion of the active region, and the thin-film substrate being configured to bend along at least one bending axis, sensing patterns in the active region of the thin-film substrate, the active region being divided into a plurality of electrically independent regions by the at least one bending axis, sensing lines in the inactive region of the thin-film substrate, the sensing lines being connected to the sensing patterns, and a flexible display device attached to the thin-film substrate to face the sensing patterns and the sensing lines.

The flexible display device may be an organic light emitting diode display device.

The flexible display device may further include a polarizing film and a window substrate sequentially adhered to the thin-film substrate by a transparent adhesive, the polarizing film and flexible display device being attached to opposite surfaces of the thin-film substrate.

The window substrate may include at least one of polymethymethacrylate (PMMA), acryl, and polyethylene terephthalate (PET).

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
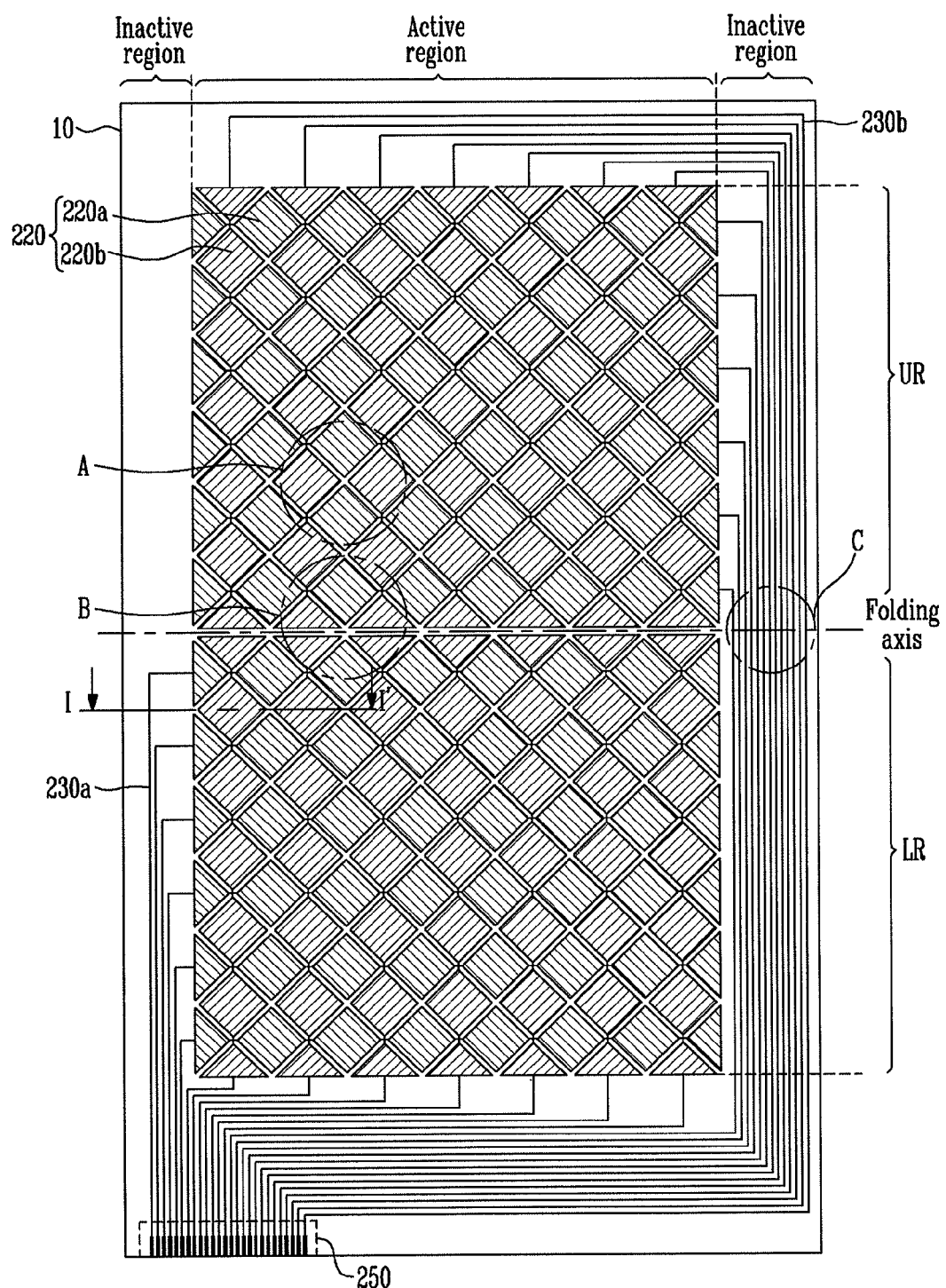
FIG. 1 illustrates a schematic plan view of a touch screen panel according to an exemplary embodiment.

Korean Patent Application No. 10-2012-0049724, filed on May 10, 2012, in the Korean Intellectual Property Office, and entitled: "FLEXIBLE TOUCH SCREEN PANEL AND FLEXIBLE DISPLAY DEVICE WITH THE SAME," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments will be described in detail with reference to the accompanying drawings.

Figure 2:
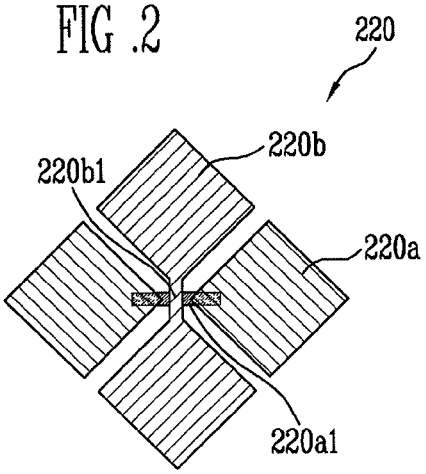
FIG. 2 illustrates an enlarged view of a sensing pattern in region A of FIG. 1.
Figure 3A:
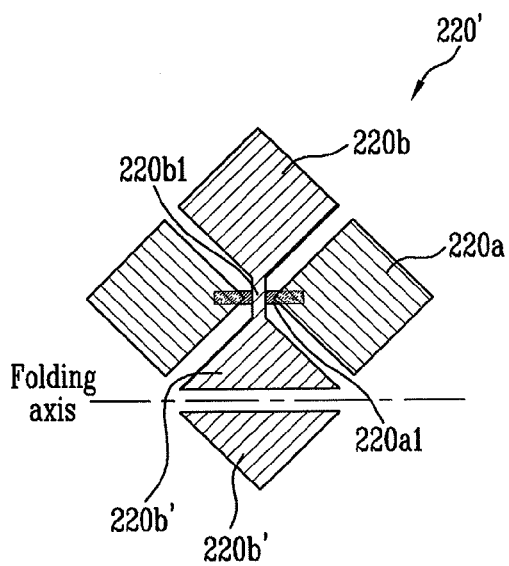
FIGS. 3A-3B illustrate enlarged views of sensing patterns in region B of FIG. 1.
Figure 3B:
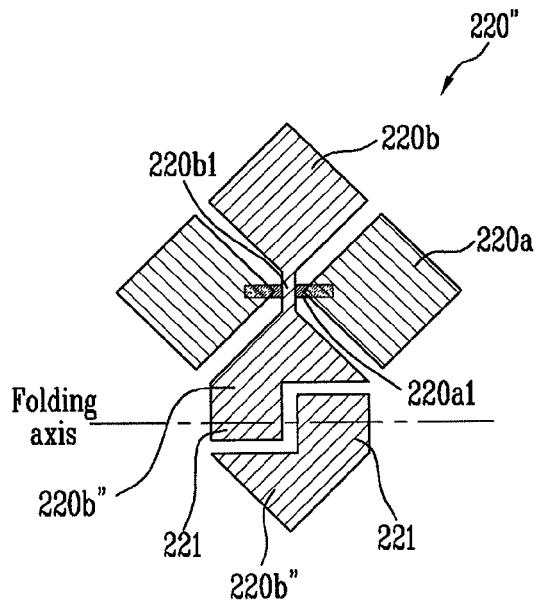

FIG. 1 is a plan view schematically showing a touch screen panel according to an exemplary embodiment. FIG. 2 and FIGS. 3A-3B are enlarged views showing sensing patterns in regions A and B of FIG. 1, respectively.

Referring to FIGS. 1 to 3B, a touch screen panel according to an exemplary embodiment may be divided into an active region and an inactive region, e.g., the inactive region may be positioned at an outer side portion of the active region. As illustrated in FIG. 1, the touch screen panel may include a thin-film substrate 10 having flexible characteristics, sensing patterns 220 formed in the active region of the thin-film substrate 10, and sensing lines 230a and 230b formed in the inactive region of the thin-film substrate 10. The sensing lines 230a and 230b connect the sensing patterns 220 to an external driving circuit (not shown) through a pad part 250. The sensing patterns 220 may include first sensing cell 220a aligned in a row unit and second sensing cells 220b aligned in a column unit.

As further illustrated in FIG. 1, the sensing lines 230a, 230b may be connected to the first sensing cells 220a in the row unit and to the second sensing cells 220b in the column unit. Therefore, the first and second sensing cells 220a and 220b may be connected to the external driving circuit (not shown) through the pad part 250.

The sensing lines 230a and 230b may be disposed in the inactive region of the thin film substrate 10, i.e., on the periphery of the active region that displays an image, and may be made of any suitable materials. For example, the sensing lines 230a and 230b may be made of a low resistance metal material, e.g., molybdenum (Mo), silver (Ag), titanium (Ti), copper (Cu), aluminum (Al), molybdenum/aluminum/molybdenum (Mo/Al/Mo), and the like, and/or a transparent conductive material, e.g., a same material as that used to form the sensing patterns 220.

The thin-film substrate 10 having the flexible characteristics may be made of a transparent material having high heat resistance and chemical resistance. For example, the thin-film substrate 10 may be made of polyimide (PI). That is, when the touch screen panel according to the exemplary embodiment includes a thin-film substrate 10 made of PI, the thin-film substrate 10 exhibits excellent heat resistance and flexibility as compared to conventional rigid substrates, e.g., substrates made of glass, polyethylene terephthalate (PET), polycarbonate (PC), etc. For example, the thin-film substrate 10 may have a thickness of about 0.005 mm to about 0.05 mm, e.g., about 0.01 mm to about 10 µm, thereby making it possible to secure the flexible characteristics of the thin-film substrate 10.

In addition, as shown in FIG. 1, the thin-film substrate 10 having the flexible characteristics may be repeatedly bent or folded, e.g., along a bending axis, i.e., a folding axis, in a first direction (a dashed horizontal line in FIG. 1). Therefore, according to example embodiments, some of the sensing patterns 220 positioned at a boundary along the bending axis may be formed of separated portions, i.e., portions spaced apart from each other by a predetermined interval, such that the sensing cells in the repeatedly bent region, i.e., in the region including the bending axis, may be prevented from being cracked and/or deteriorated. The sensing patterns formed of separated portions will be described in more detail below with reference to FIGS. 3A and 3B.

In detail, the active region may be divided into a plurality of regions by at least one bending axis. For example, as illustrated in FIG. 1, the active region may be divided into two regions by the folding axis, e.g., an upper region UR above the folding axis and a lower region LR below the folding axis. However, example embodiments are not necessarily limited thereto, e.g., two bending axes, i.e., folding axes, may be formed to divide the active region into three regions based on the two bending axis. The plurality of divided regions may be electrically independent of each other.

In further detail, according to example embodiments, the sensing patterns 220 may be formed differently in accordance with their position in the active region relatively to the bending axis. That is, some sensing patterns 220 may be formed as integral patterns (FIG. 2) in a region that is not positioned at the boundary of the bending axis, e.g., patterns in region A of FIG. 1, while other sensing patterns 220, i.e., sensing patterns 220' and 220" of FIGS. 3A and 3B, may be formed as separated portions in a region positioned at the boundary of the bending axis, e.g., patterns in region B of FIG. 1. Further, as the active region is divided into a plurality of electrically independent regions by the bending axis, the sensing patterns in each of the divided active regions, e.g., patterns in each of the upper region UR and lower region LR, are electrically separated from each other.

As further illustrated in FIG. 1, sensing patterns 220 formed in the lower region LR of the active region may include first and second sensing cells electrically connected to the first sensing lines 230a. The first sensing lines 230a connected to the first sensing cells 220a in the lower region LR may be arranged on the inactive region on a left side relative to the active region, and the first sensing lines 230a connected to the second sensing cells 220b in the lower region LR may be arranged on the inactive region on a lower side relative to the active region.

Similarly, sensing patterns 220 formed in the upper region UR of the active region may include first and second sensing cells electrically connected to the second sensing lines 230b. The second sensing lines 230b connected to the first sensing cells 220a in the upper region UR may be arranged in the inactive region on a right side relative to the active region, and second sensing lines 230b connected to the second sensing cells 220b in the upper region UR may be arranged on the inactive region on an upper side relative to the active region.

As further illustrated in FIG. 1, since the first and second sensing lines 230a and 230b are connected to the pad part 250 at a lower distal end of the inactive region, the second sensing lines 230b extending from the upper region UR of the active region intersect the bending axis, i.e., region C in FIG. 1. Therefore, according to example embodiments, the second sensing lines 230b may be implemented to have a shape or a material, e.g., a robust material, capable resisting bending in the region of the bending axis. As such, the sensing lines 230b may be prevented from being damaged in the flexible environment. A structure of the second sensing lines 230b in region C will be described in more detail below with reference to FIGS. 4A-4D.

A configuration of the sensing patterns 220 according to example embodiments will be described below.

Referring to FIG. 2, the sensing patterns 220 formed in the region that is not positioned at the boundary of the bending axis, i.e., sensing patterns 220 in region A, may include a plurality of first sensing cells 220a formed to be connected to each other for each row line in the first direction, e.g., in row direction, first connecting lines 220a1 connecting the first sensing cells 220a to each other in the row direction, second sensing cells 220b formed to be connected to each other for each column line in a second direction, e.g., in a column direction, and second connecting lines 220b1 connecting the second cells 220b to each other in the column direction. Each of the first and second sensing cells 220a and 220b in the region A may be formed as a one-piece unit, so each of the sensing patterns 220 is formed as an integral pattern (FIG. 2) in region A. In other words, each of the first and second sensing cells 220a and 220b in the region that is not positioned at the boundary of the bending axis may be a single continuous unit that does not intersect any portion of the bending axis. It is noted that although only some of the sensing patterns 220 are shown in FIG. 2 for convenience, the touch screen panel according to the example embodiments the sensing patterns 220 of FIG. 2 that are repeatedly disposed.

As illustrated in FIG. 2, the first and second sensing cells 220a and 220b may be alternatively disposed so as not to overlap each other, and the first and second connecting lines 220a1 and 220b1 may intersect each other. For example, the first and second connecting lines 220a1 and 220b1 may have an insulating layer (not shown) interposed therebetween in order to secure stability.

For example, the first and second sensing cells 220a and 220b may be formed integrally with the first and second connecting lines 220a1 and 220b1, respectively, using a transparent conductive material, e.g., indium tin oxide (ITO), or may be formed separately from the first and second connecting lines 220a1 and 220b1 and then electrically connected thereto. For example, the second sensing cells 220b may be patterned integrally with the second connecting lines 220b1 in the column direction, and the first sensing cells 220a may be patterned between the second sensing cells 220b so as to each have an independent pattern and be connected to each other in the raw direction by the first connecting lines 220a1 positioned at the upper or lower portion thereof. In this case, for example, the first connecting lines 220a1 may directly contact the first sensing cells 220a at an upper or lower portion of the first sensing cells 220a to be electrically connected thereto or may be electrically connected to the first sensing cells 220a through contact holes.

The first connecting lines 220a1 may be made of a transparent conductive material, e.g., ITO, or may be made of an opaque low resistance metal material. The first connecting lines 220a1 may have an adjustable width in order to prevent or substantially minimize visibility of the pattern through a screen of the display device.

Referring to FIGS. 3A-3B, sensing patterns, i.e., sensing patterns 220' and 220", positioned at the boundary of the bending axis may have a substantially same configuration as that of the sensing patterns 220 shown in FIG. 2, except for shapes of the sensing cells in a region traversing the bending axis. It is noted that sensing patterns 220' and 220" at the boundary of the bending axis refer to patterns that include sensing cells in a region that overlaps the bending axis, e.g., the bending axis extends between two portions of a same sensing cell. For example, in the sensing patterns 220' and 220", the bending axis extends between two separated portions of a same second sensing cell, so the second sensing cell has a different shape than the second sensing cell 220b of the sensing patterns 220 in region A.

As the touch screen panel according to the example embodiments has sensing patterns formed on a flexible thin-film substrate that may be repeatedly bent along a bending axis, sensing patterns positioned at the bending axis according to example embodiments may be formed to have different shapes. Therefore, sensing cells at the bending axis may not be damaged even if bending is repeatedly performed. That is, in the example embodiments, sensing sells 220b' and 220b" formed in the region traversed by the bending axis may include separated portions spaced apart from each other based on the bending axis where the touch screen is bent, as shown in FIGS. 3A and 3B.

In detail, referring to the example of FIG. 3A, the second sensing cells 220b' formed in the region intersecting with the bending axis may include portions spaced apart from each other by a vertical predetermined interval based on the bending axis, so as not to overlap the bending axis. That is, the second sensing cell 220b' may be divided into two portions, e.g., upper and lower sensing cells, which are not electrically connected to each other. For example, the second sensing cell 220b' may be divided into two discrete portions completely separated from each other by a predetermined distance along a direction perpendicular to the bending axis, e.g., two portions symmetric with respect to the bending axis, so the bending axis extends between the two completely separated portions. For example, an upper portion of the second sensing cell 220b' may be in the upper region UR of the active region above the bending axis and may be connected via the connecting line 220a1 to an adjacent second sensing cell 220b and the lines 230b, while a lower portion of the second sensing cell 220b' may be in the lower region LR of the active region below the bending axis and electrically separated from the sensing pattern 220' above the bending axis, i.e., connected to sensing line 230a.

Therefore, in the touch screen panel according to the example embodiments, the portions of the sensing patterns in the divided regions of the active region may be operated in a state in which they are electrically separated from each other. For example, referring to FIG. 1, sensing patterns formed in the lower region LR of the active region may be connected to the pad part 250 through the first sensing lines 230a, and the sensing patterns formed in the upper region UR of the active region may be connected to the pad part 250 through the second sensing lines 230b.

In the touch screen panel, e.g., capacitive type touch panel, according to the example embodiments, when a contact object, e.g., a human hand or a stylus pen, contacts the touch screen panel, a change in capacitance according to a contact position is transferred from the sensing patterns 220, 220', each formed in the upper and lower regions of the active region, to the driving circuit (not shown) via the first and second sensing lines 230a and 230b and the pad part 250. In this case, the change in capacitance is converted into an electrical signal by an X and Y input processing circuits, or the like (not shown), such that the contact position is recognized.

In the case of the example shown in FIG. 3A, since the second sensing cells 220b' positioned and divided at the boundary of the bending axis may have a reduced area, e.g., an area corresponding to about a half of that of sensing cells positioned at other regions, the sensing sensitivity may be reduced. Therefore, in another example shown in FIG. 3B, the second sensing cells 220b" positioned and divided at the boundary of the bending axis are implemented to have a wider area.

Referring to FIG. 3B, each second sensing cell 220b" may be divided into two completely separated portions with the bending axis therebetween, as discussed previously with reference to FIG. 3A, and may include a protrusion part 221 that partially overlaps the bending axis. Here, the protrusion parts 221 may be formed integrally with the second sensing cells 220b". As shown in FIG. 3B, the upper and lower sensing cells 220b" divided based on the boundary of the bending axis may be separated from each other, but are different from those of the example of FIG. 3A in that the protrusion parts 221 of each of the second sensing cells 220b" overlap the bending axis. Through the above-mentioned configuration, the area of the sensing cells 220b" positioned at the boundary of the bending axis is increased, thereby increasing sensing sensitivity.

Here, the region of the protrusion part 221 overlaps the bending axis. While the protrusion part 221 may be damaged by repetitive bending, a remaining portion of the second sensing cells 220b" may continue operation. Further, as the second sensing cell 220b" is separated vertically into two electrically independent portions, the two portions may be normally and separately operated.

In addition, as described above with reference to FIG. 1, since each of the first and second sensing lines 230a, 230b is connected to the single pad part 250 formed at the distal end of the lower region of the inactive regions, a portion of the second sensing lines 230b (the region C) intersect with the bending axis. According to the example embodiments, the second sensing lines 230b may be implemented to have a shape or a material resistant to bending at the intersection region.

FIGS. 4A to 4D are enlarged views showing examples of the sensing lines 230b in region C.

Figure 4A:
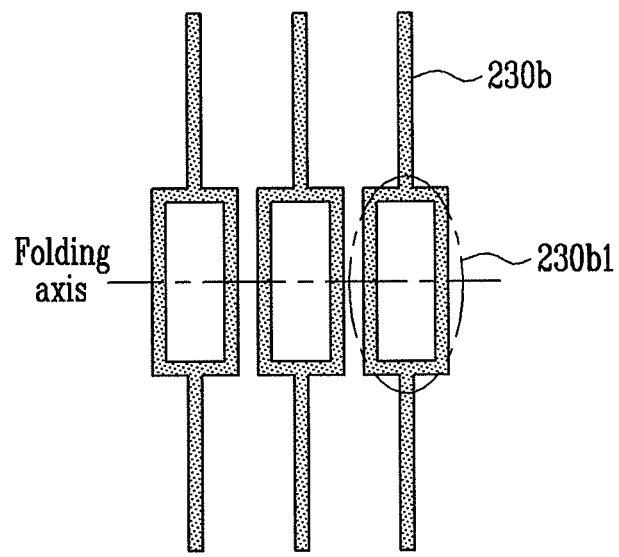
FIGS. 4A-4D illustrate enlarged views of a sensing line in region C of FIG. 1.

For example, referring to FIG. 4A, each of the second sensing lines 230b may include a plurality of lines at a portion 230b1 corresponding to the region C, i.e., in which it intersects with the bending axis. That is, a single line 230b may branch into a plurality of parallel lines 230b1, so the plurality of lines 230b1, i.e., rather than a single line, overlap the region C. Through the above-mentioned configuration, even if one of the plurality of lines 230b1 overlapping the bending axis is damaged due to repetitive bending, a normal operation may be continued via the remaining lines.

Figure 4B:
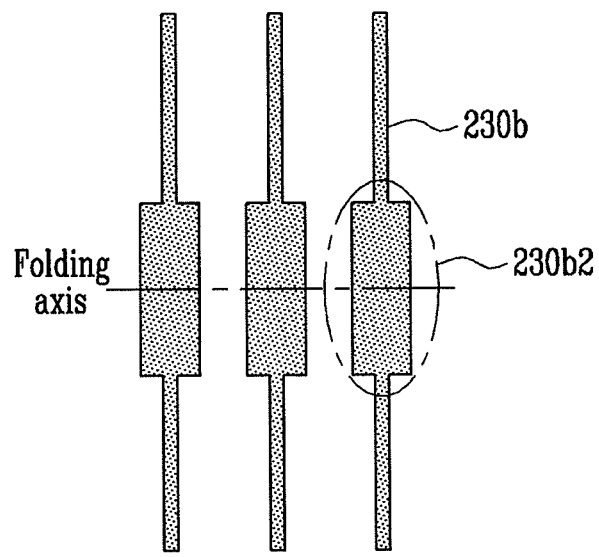

In another example, referring to FIG. 4B, a portion 230b2 of the second sensing line 230b corresponding to the region C, i.e., in which the second sensing line 230b intersects with the bending axis, is configured to have an area wider than that of the second sensing line of other regions. That is, the portion 230b2 may be substantially wider than the second sensing line 230b along the first direction, i.e., the direction of the bending axis, so the larger width in the overlapping region may prevent or substantially minimize damage caused by repetitive bending.

Figure 4C:
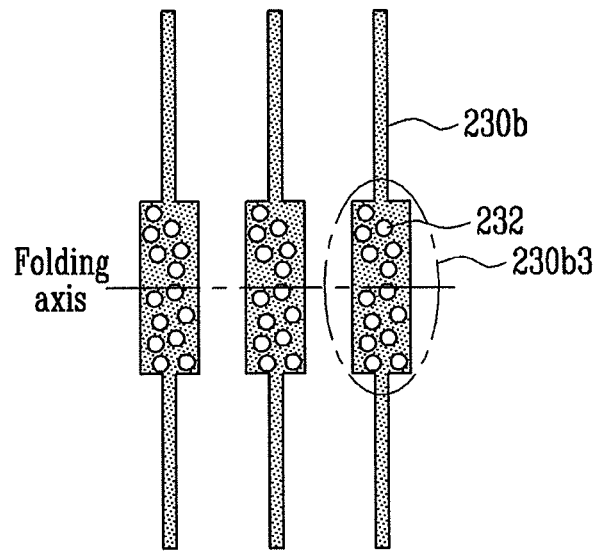

In yet another example, referring to FIG. 4C, a portion 230b3 of the second sensing line 230b corresponding to the region C, i.e., in which the second sensing line 230b intersects with the bending axis, may be configured to have an area wider than that of second sensing line of other regions. Further, a plurality of holes 232 may be further formed in the portion 230b3. That is, larger width of the portion 230b3 may prevent or minimize damage, while the holes 232 may prevent or substantially minimize progress of cracks locally generated by repetitive bending.

Figure 4D:
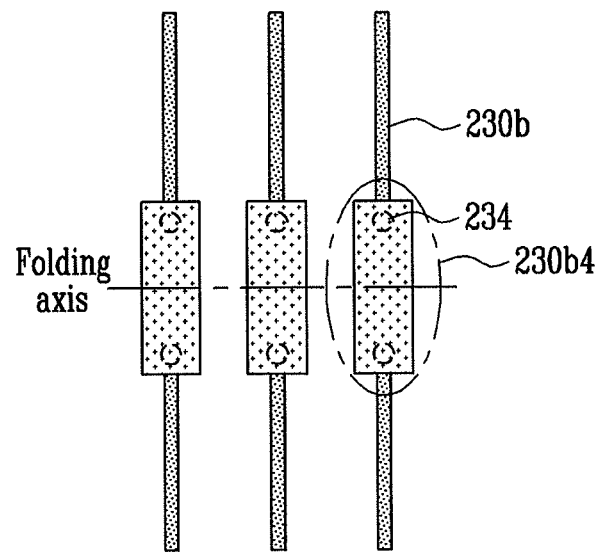

In yet another example, referring to FIG. 4D, the second sensing lines 230b may include a connection part 230b4 corresponding to the region C, i.e., in which the second sensing line 230b intersects the bending axis. The connection part 230b4 may be formed of a different material than t the second sensing lines 230b and may exhibit good bending characteristics. The connection part 230b4 may be connected to the second sensing lines 230b through contact holes 234. The connection part 230b4 may be made of, e.g., a poly-ethylene-dioxythiophene (PEDOT) based organic conductive material, a flexible metal material such as copper (Cu), or the like.

Example embodiments described above with reference to FIGS. 1-4 are implemented in a configuration in which the first and second sensing lines 230a and 230b led from the first and second active regions are connected to the single pad part 250 formed at a distal end of the lower portion of the inactive region. In the case of the above-mentioned structure, the region (the region C) in which the second sensing lines 230b from the second active region intersect with the bending axis is generated, and the second sensing lines 230b may have a shape or a material that minimize damage caused by bending.

Figure 5:
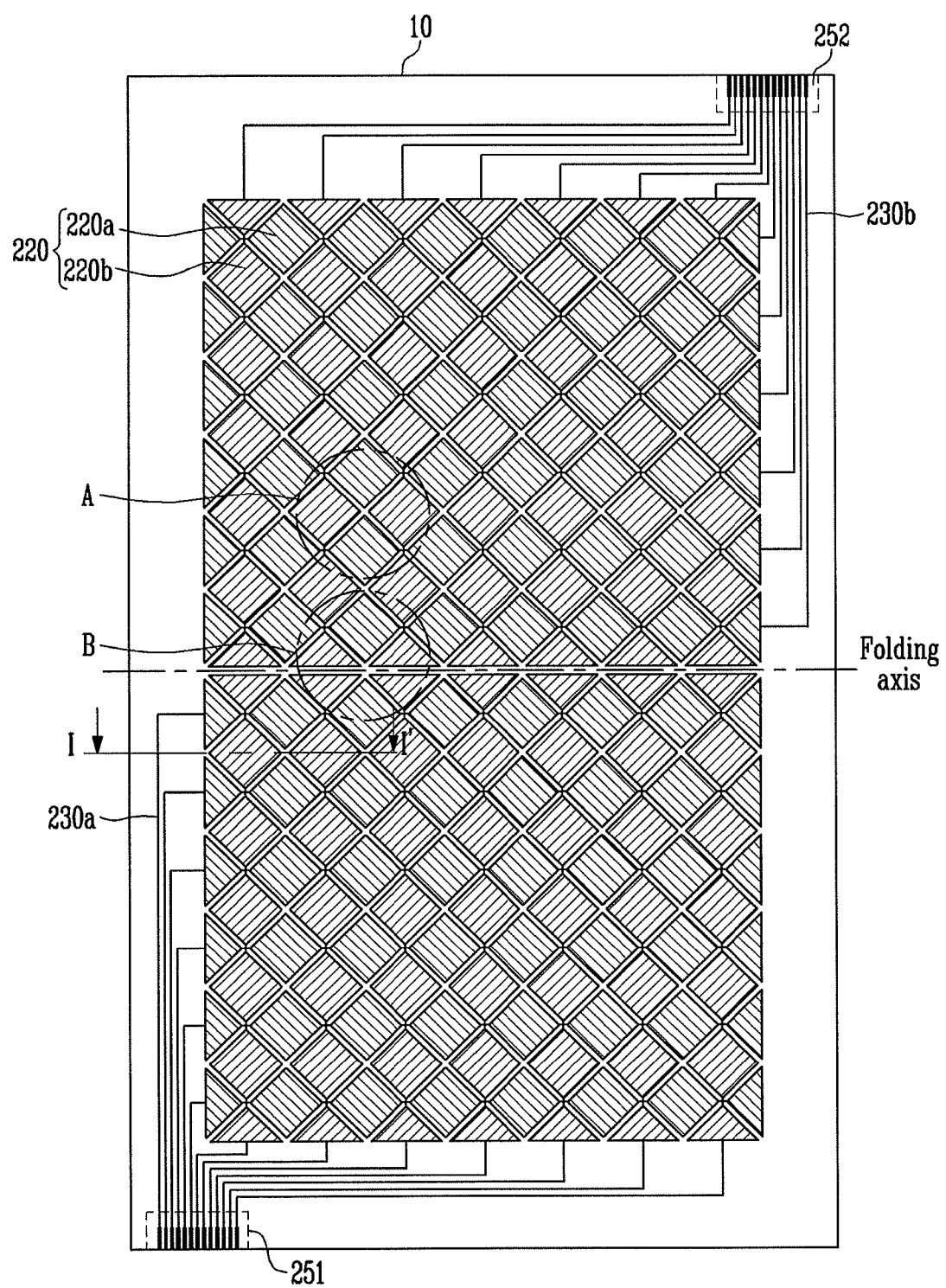
FIG. 5 illustrates a schematic plan view of a touch screen panel according to another exemplary embodiment.

FIG. 5 is a plan view schematically showing a touch screen panel according to another exemplary. The touch screen panel in FIG. 5 has the same configuration as the touch screen panel of FIGS. 1-3B, except that the first and second sensing lines 230a and 230b each led from the lower and upper regions are connected to first and second pad parts 251 and 252 provided at distal ends of the lower and upper regions, respectively.

That is, in FIG. 5, since the first sensing lines 230a from the lower active region are connected to the first pad part 251 provided at a distal end of the lower portion of the inactive region, and the second sensing lines 230b from the upper active region are connected to the second pad part 252 provided at a distal end of the upper portion of the inactive region, the region in which the sensing lines 230a and 230b intersect with the bending axis are not generated. Therefore, the sensing lines may not be damaged by repetitive bending.

Figure 6:
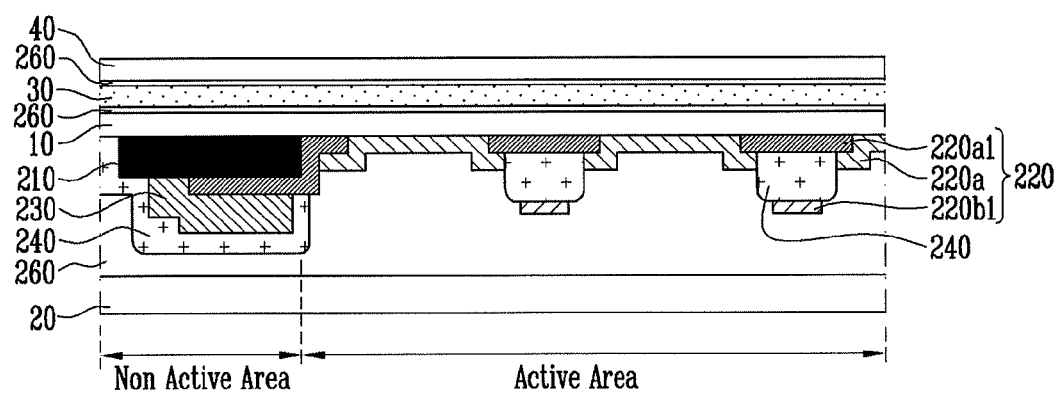
FIG. 6 illustrates a cross-sectional view along line I-I' of FIGS. 1 and 5.

FIG. 6 is a cross-sectional view along line I-I' of FIGS. 1 and 5. FIG. 6 is the cross-sectional view showing a portion of the active region and the inactive region of the touch screen panel formed on a first surface of the thin-film substrate 10 having the flexible characteristics, wherein a cross-section of a flexible display device including the flexible touch screen panel is shown.

Here, the thin-film substrate 10 may be made of a transparent material having high heat resistance and chemical resistance, e.g., PI. In addition, in FIG. 6, a structure in which a display device 20 is attached to a lower surface of the touch screen panel, i.e., a first surface of the thin-film substrate 10, by a transparent adhesive layer 260 is shown. Here, the display device 20, which is a display device having the flexible characteristics, may be implemented, e.g., as an organic light emitting display device.

As an example, since the organic light emitting display device, which is a self-emitting element, does not need to include a backlight unit, e.g., unlike an existing liquid crystal display device, a substrate may be made of, e.g., polymethylmethacrylate (PMMA), acryl, polyester, e.g., polyethylene terephthalate (PET), and the like, having the flexible characteristics, such that the substrate may have the flexible characteristics.

The transparent adhesive layer 260 may be made of a transparent adhesive material having high light transmissivity, e.g., a super view resin (SVR), an optical cleared adhesive (OCA), or the like.

In addition, as shown, a polarizing film 30 and a window substrate 40 may be stacked on the second surface of the thin-film substrate 10. These components may be adhered to each other by the transparent adhesive layer 260.

Referring to FIG. 6, the sensing patterns 220 formed on the active region of the thin-film substrate 10 may include first sensing cells 220a formed to be connected to each other for each row line in a first direction, first connecting lines 220a1 connecting the first sensing cells 220a to each other in the row direction, second sensing cells 220b formed to be connected to each other for each column line in the column direction, and second connecting lines 220b 1 connecting the second sensing cells 220b to each other in the column direction, and also include an insulating layer 240 interposed between the first connecting lines 220a1 and the second connecting lines 220b1 at an intersection portion therebetween. It is noted that thickness of components, e.g., the sensing patterns 220, in FIG. 6 is exaggerated for convenience of explanation, and the actual thickness of the components is significantly thinner than the thickness shown in FIG. 6.

In addition, the inactive region positioned at the outer side portion of the active region is formed with a black matrix 210 and sensing lines 230 overlap the black matrix 210 and electrically connected to the sensing patterns 220, as shown. The black matrix 210 may form an edge part of a display region while preventing patterns of sensing lines, and the like, formed in the inactive region from being visible.

With the structure according to the example embodiments, the touch screen panel may be positioned between the display device 20 and the polarizing film 10, thereby making it possible to prevent visibility of the sensing patterns and minimize reflectivity while maintaining the flexible characteristics. In addition, since the display device 20 and the touch screen panel have flexible characteristics, a window substrate 40 attached to the upper surface of the polarizing film 10 may be made of a material exhibiting flexible characteristics in order to enhance strength of a device. For example, the window substrate 40 may be made of PMMA, acryl, polyester, e.g., PET, or the like, and may be implemented to have a thickness of about 0.7 mm.

As set forth above, according to example embodiments, the active region in which the sensing patterns are formed may be divided into a plurality of regions with respect to a bending axis where the touch screen panel is bent, and sensing cells in a region traversing the bending axis may be divided into discrete portions separated between the plurality of divided regions. Accordingly, damage to the sensing cells due to repeated bending may be prevented or substantially minimized. In addition, the sensing lines may be formed to have shapes or material that minimizes wear due to in regions intersecting the bending axis, thereby preventing or minimizing damaged in the flexible environment.

In contrast, a conventional capacitive type touch screen panel may include sensing patterns on a glass substrate, which requires minimal thickness of a predetermined value for processing, thereby increasing thickness and reducing flexibility. In addition, since the conventional sensing patterns are applied to the substrate without considering an environment in which the touch screen panel is flexibly used, i.e., an environment where the touch screen panel may be repeatedly bent or folded, the sensing patterns may be formed in regions where the touch screen panel is repeatedly bent or folded, thereby increasing a possibility of cracks and breakage in the sensing patterns.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A flexible touch screen panel, comprising:
a flexible thin-film substrate including an active region and an inactive region, the inactive region being at an outer side portion of the active region, and the thin-film substrate being bendable along at least one bending axis;
sensing patterns in the active region of the thin-film substrate, the at least one bending axis separating some of the sensing patterns in the active region into a plurality of electrically independent regions; and
sensing lines in the inactive region of the thin-film substrate, the sensing lines being connected to the sensing patterns,
wherein each sensing pattern includes first sensing cells connected to each other in a first direction parallel to the bending axis, and second sensing cells connected to each other in a second direction perpendicular to the first direction, and wherein sensing patterns in a region overlapping the bending axis include divided second sensing cells.

2. The flexible touch screen panel as claimed in claim 1, wherein sensing patterns in each of the plurality of regions of the active region are separately operated from sensing patterns in other regions of the plurality of regions.

3. The flexible touch screen panel as claimed in claim 1, wherein the thin-film substrate includes a polyimide material.

4. The flexible touch screen panel as claimed in claim 3, wherein the thin-film substrate has a thickness of about 0.005 nm to about 0.05 mm.

5. The flexible touch screen panel as claimed in claim 1, wherein each sensing pattern further includes:
   first sensing lines connecting adjacent first sensing cells to each other; and
   second sensing lines connecting adjacent second sensing cells to each other.

6. The flexible touch screen panel as claimed in claim 5, wherein the first connecting lines and the second connecting lines have an insulating layer interposed therebetween at an intersection portion therebetween.

7. The flexible touch screen panel as claimed in claim 1, wherein each divided second sensing cell includes two portions spaced apart from each other.

8. The flexible touch screen panel as claimed in claim 7, wherein the two portions in each divided second sensing cell are spaced apart from each other along the second direction, the bending axis being between the two portions.

9. The flexible touch screen panel as claimed in claim 7, wherein each of the two portions in each divided second sensing cell includes a protrusion part, the protrusion part extending along the second direction to partially overlap the bending axis.

10. The flexible touch screen panel as claimed in claim 1, wherein sensing patterns in a first region of the plurality of regions are connected to a pad part by different sensing lines than sensing patterns in a second region of the plurality of regions, the first and second regions being different from each other.

11. The flexible touch screen panel as claimed in claim 10, wherein the different sensing lines of the first and second regions are connected to a same pad part, the pad part being at a distal end of one side of the inactive region.

12. The flexible touch screen panel as claimed in claim 11, wherein some of the sensing lines intersect the bending axis, the sensing lines being branched into a plurality of lines at a portion intersecting the bending axis.

13. The flexible touch screen panel as claimed in claim 11, wherein some of the sensing lines intersect the bending axis, a first portion of the sensing lines at a portion intersecting the bending axis having a wider area than other portions of the sensing lines.

14. The flexible touch screen panel as claimed in claim 13, wherein the portion of the sensing lines having the wider area includes a plurality of holes.

15. The flexible touch screen panel as claimed in claim 11, wherein some of the sensing lines intersect with the bending axis, the sensing lines include a connection part of a different material at a portion intersecting the bending axis, and the connection part being connected to the sensing lines through contact holes.

16. The flexible touch screen panel as claimed in claim 10, wherein the different sensing lines of the first and second regions are connected to a plurality of pad parts at different positions of the inactive region, respectively.

17. A flexible display device having a touch screen panel, comprising:
   a flexible thin-film substrate including an active region and an inactive region, the inactive region being at an outer side portion of the active region, and the thin-film substrate being configured to bend along at least one bending axis;
   sensing patterns in the active region of the thin-film substrate, the at least one bending axis separating some of the sensing patterns in the active region into a plurality of electrically independent regions;
   sensing lines in the inactive region of the thin-film substrate, the sensing lines being connected to the sensing patterns; and
   a flexible display device attached to the thin-film substrate to face the sensing patterns and the sensing lines,
   wherein each sensing pattern includes first sensing cells connected to each other in a first direction parallel to the bending axis, and second sensing cells connected to each other in a second direction perpendicular to the first direction, and
   wherein sensing patterns in a region overlapping the bending axis include divided second sensing cells, each divided second sensing cell including two portions spaced apart from each other.

18. The flexible touch screen panel as claimed in claim 1, wherein the thin-film substrate is bendable in the active region along the at least one bending axis.

19. The flexible touch screen panel as claimed in claim 1, wherein the at least one bending axis separates the sensing patterns of a same display panel into a plurality of electrically independent regions.

* * * * *